United States Patent
Haq et al.

(10) Patent No.: US 9,816,788 B2
(45) Date of Patent: Nov. 14, 2017

(54) FIBROUS ARMOUR MATERIAL

(71) Applicant: BAE SYSTEMS plc, London (GB)

(72) Inventors: Sajad Haq, South Gloucestershire (GB); Caroline Joleen Morley, South Gloucestershire (GB)

(73) Assignee: BAE SYSTEMS pllc, London (GB)

( * ) Notice: Subject to any disclaimer, the term of this patent is extended or adjusted under 35 U.S.C. 154(b) by 395 days.

(21) Appl. No.: 14/358,783

(22) PCT Filed: Nov. 14, 2012

(86) PCT No.: PCT/GB2012/052757
§ 371 (c)(1),
(2) Date: May 16, 2014

(87) PCT Pub. No.: WO2013/072669
PCT Pub. Date: May 23, 2013

(65) Prior Publication Data
US 2014/0311328 A1    Oct. 23, 2014

(30) Foreign Application Priority Data
Nov. 17, 2011 (GB) .................................. 1120032.6

(51) Int. Cl.
*F41H 5/02* (2006.01)
*F41H 5/04* (2006.01)
(Continued)

(52) U.S. Cl.
CPC ................. *F41H 5/02* (2013.01); *B64D 7/00* (2013.01); *F41H 1/02* (2013.01); *F41H 5/0485* (2013.01);
(Continued)

(58) Field of Classification Search
CPC ...... F41H 5/0478; Y10S 428/911; B32B 5/12; B32B 5/26
(Continued)

(56) References Cited

U.S. PATENT DOCUMENTS 3,828,699 A * 8/1974 Bowen ........................... 109/80
4,186,648 A * 2/1980 Clausen et al. .............. 89/36.02
(Continued)

FOREIGN PATENT DOCUMENTS

WO    2004103231 A1    12/2004
WO    2006121411 A1    11/2006
(Continued)

OTHER PUBLICATIONS

International Preliminary Report on Patentability and Written Opinion received for Patent Application No. PCT/GB20121052757, dated May 30, 2014, 9 pages.
(Continued)

*Primary Examiner* — Samir Abdosh
(74) *Attorney, Agent, or Firm* — Finch & Maloney PLLC

(57) ABSTRACT

According to the invention there is provided a fibrous armor material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is selected so that the shear thickening fluid has a viscosity-shear stress characteristic substantially corresponding to curve B or lying between curve B and curve D as shown in FIG. 2.

19 Claims, 1 Drawing Sheet

Figure 1:
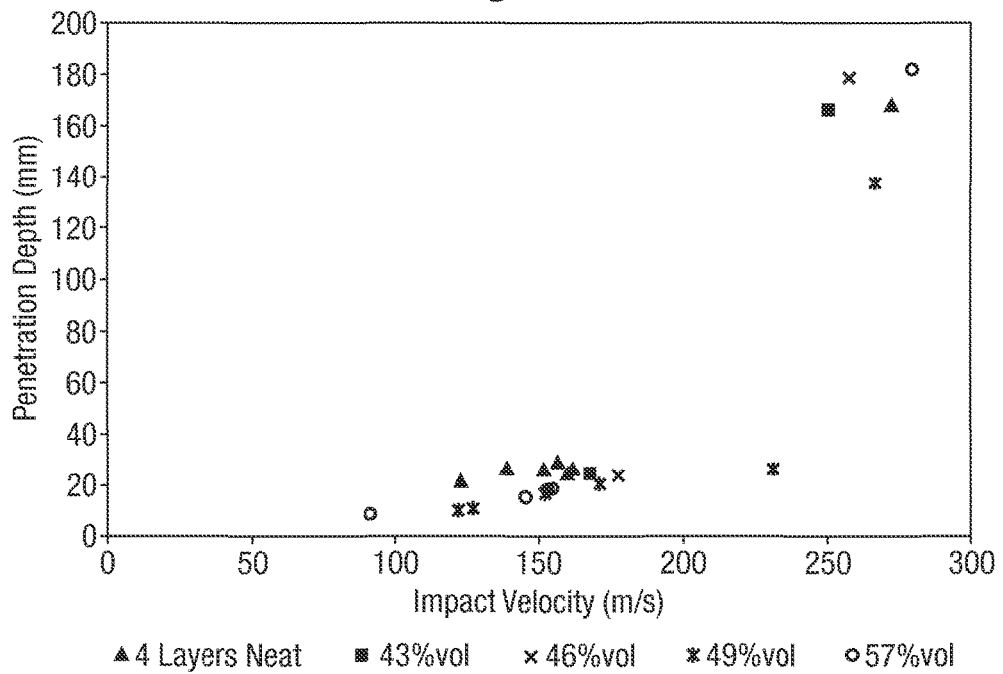

(51) Int. Cl.
*B64D 7/00* (2006.01)
*F41H 1/02* (2006.01)
*F41H 7/00* (2006.01)
*F41H 7/02* (2006.01)

(52) U.S. Cl.
CPC ............... *F41H 7/00* (2013.01); *F41H 7/02* (2013.01); *Y10T 442/2623* (2015.04)

(58) Field of Classification Search
USPC .......... 89/36.02, 36.04, 36.05, 917; 428/911; 109/49.5
See application file for complete search history.

(56) References Cited

U.S. PATENT DOCUMENTS

| | | | |
|---|---|---|---|
| 4,200,677 | A | 4/1980 | Bottini et al. |
| 4,292,882 | A | 10/1981 | Clausen |
| 4,404,889 | A | 9/1983 | Miguel |
| 4,539,253 | A | 9/1985 | Hirschbuehler et al. |
| 4,678,702 | A | 7/1987 | Lancaster et al. |
| 4,879,165 | A | 11/1989 | Smith |
| 5,061,545 | A | 10/1991 | Li et al. |
| 5,167,876 | A | 12/1992 | Lem et al. |
| 5,739,184 | A | 4/1998 | Marbly et al. |
| 5,796,028 | A | 8/1998 | Field et al. |
| 7,226,878 | B2* | 6/2007 | Wagner et al. ............... 442/59 |
| 7,498,276 | B2* | 3/2009 | Wagner et al. ............... 442/59 |
| 7,825,045 | B1* | 11/2010 | Wagner et al. ............... 442/59 |
| 8,132,494 | B1* | 3/2012 | Nguyen et al. ............... 89/36.05 |
| 8,322,268 | B1 | 12/2012 | Booher, Sr. |
| 8,627,756 | B1 | 1/2014 | Booher, Sr. |
| 2002/0037391 | A1 | 3/2002 | Harpell et al. |
| 2003/0129900 | A1 | 7/2003 | Chiou |
| 2005/0266748 | A1* | 12/2005 | Wagner et al. ............... 442/59 |
| 2006/0234577 | A1* | 10/2006 | Wagner et al. ............... 442/135 |
| 2006/0252325 | A1* | 11/2006 | Matsumura et al. ......... 442/123 |
| 2006/0252328 | A1 | 11/2006 | Bingenheimer |
| 2009/0311930 | A1 | 12/2009 | Wang et al. |
| 2010/0080971 | A1 | 4/2010 | Neal |
| 2010/0269236 | A1* | 10/2010 | Wagner et al. ............... 2/2.5 |
| 2010/0275765 | A1 | 11/2010 | LaGrotta et al. |
| 2011/0041675 | A1 | 2/2011 | Ermalovich |
| 2011/0072959 | A1 | 3/2011 | Petrovich et al. |
| 2011/0113534 | A1 | 5/2011 | Sauer et al. |
| 2012/0137865 | A1 | 6/2012 | Citterio et al. |
| 2012/0171477 | A1* | 7/2012 | Sang et al. ............... 428/339 |
| 2012/0177869 | A1 | 7/2012 | Micarelli |
| 2014/0311327 | A1* | 10/2014 | Dunleavy et al. ............ 89/36.02 |
| 2014/0311328 | A1* | 10/2014 | Haq et al. ............... 89/36.02 |
| 2014/0311329 | A1* | 10/2014 | Dyke et al. ............... 89/36.02 |

FOREIGN PATENT DOCUMENTS

| | | |
|---|---|---|
| WO | 2008061170 A1 | 5/2008 |
| WO | 2008097362 A1 | 8/2008 |
| WO | 2010096037 A1 | 8/2010 |
| WO | 2011112590 A2 | 9/2011 |
| WO | 2012005785 A2 | 1/2012 |
| WO | 2013072667 A1 | 5/2013 |
| WO | 2013072668 A1 | 5/2013 |
| WO | 2013072669 A1 | 5/2013 |

OTHER PUBLICATIONS

International Search Report and Written Opinion of the International Searching Authority received for Patent Application No. PCT/GB2012/052757, dated Jan. 30, 2013, 15 pages.
GB Intellectual Property Office Search Report under Section 17(5) received for GB Patent Application No. 1120032.6, dated Feb. 20, 2012, 3 pages.
Egres, et al., "Stab Resistance of Shear Thickening Fluid (STF)—Kevlar Composites for Body Armor Applications," Proceedings of the 24th Army Science Conference, Orlando, Florida, Nov. 29, 2004 through Dec. 2, 2004, 8 pages.
International Prelim. Report on Patentability and Written Opinion received for Patent Application No. PCT/GB2012/052755, dated May 30, 2014, 8 pages.
International Search Report and Written Opinion of the International Searching Authority received for Patent Application No. PCT/GB2012/052755, dated Jan. 31, 2013, 15 pages.
GB Intellectual Property Office Search Report under Section 17(5) received for GB Application No. 1120031.8 dated Feb. 17, 2012, 3 pages.
Mayo, et al., "Stab and puncture characterization of thermoplastic-impregnated aramid fabrics", Elsevier, International Journal of Impact Engineering, vol. 36, 2009, pp. 1095-1105.
International Prelim. Report on Patentability and Written Opinion received for Patent Application No. PCT/GB2012/052756, dated May 30, 2014, 9 pages.
International Search Report and Written Opinion of the International Searching Authority received for Patent Application No. PCT/GB2012/052756, dated Feb. 5, 2013, 16 pages.
GB Intellectual Property Office Search Report under Section 17(5) received for GB Patent Application No. 1120033.4 dated Feb. 20, 2012, 3 pages.

* cited by examiner

FIBROUS ARMOUR MATERIAL

This invention relates to a fibrous armour material, methods of manufacturing same and to protective material and articles manufactured therefrom.

Body armour is used by personnel in various fields to afford protection against a variety of impact events. The body armour may be intended to provide anti-ballistic protection, ie, protection against projectiles and bodies such as splinters or other fragmentary material moving at high velocity. Also, body armour may be used to provide spike resistance, such as against blades and other sharp weapons, or needles. It is well known to manufacture body armour from a plurality of layers of a polyaramid fabric such as Kevlar®, which is poly(paraphenylene terephthalamide), or a similar material. It has been proposed to improve the properties of this type of body armour by impregnating at least some of the layers of fabric with a shear thickening fluid (STF). Protective material of this type for use in body armour is described in U.S. Pat. No. 7,226,878, U.S. Pat. No. 5,854,143, US2004/0094026 and US2006/0040576. STF's are non-Newtonian fluids which exhibit substantial increases in viscosity under the application of a shearing force. The intention of using fabric which is impregnated with STF as body armour is to improve anti-ballistic properties and flexibility. However, the present inventors have discovered that, in at least some embodiments, the use of layers of aramid fabric which have been impregnated with a STF actually results in a deterioration in anti-ballistic properties. Accordingly, there is an on-going need to develop improved STF's which can be used to manufacture protective material having improved ballistic performance.

The present invention, in at least some of its embodiments, addresses the above described problems and needs.

Figure 2:
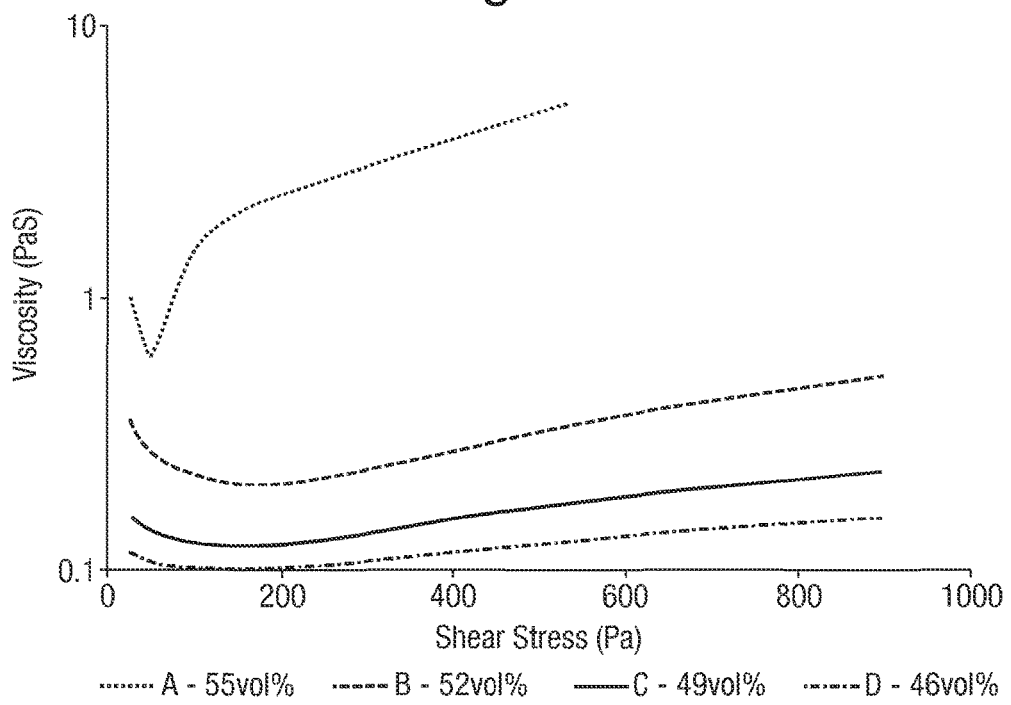

According to a first aspect of the invention there is provided a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is selected so that the shear thickening fluid has a viscosity-shear stress characteristic substantially corresponding to curve B or lying between curve B and curve D as shown in FIG. 2.

Preferably, the volume fraction of the thickening agent in the shear thickening fluid is selected so that the shear thickening fluid has a viscosity-shear stress characteristic substantially corresponding to curve B or curve C, or lying between curve B and curve C as shown in FIG. 2.

Details of the methodology used to obtain the viscosity-shear stress curves shown in FIG. 2 are provided elsewhere in this specification.

According to a second aspect of the invention there is provided a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is selected so that the shear thickening fluid has a viscosity of 0.11 to 0.21 PaS at a shear stress of 200 Pa, and/or a viscosity of 0.13 to 0.27 PaS at a shear stress of 400 Pa, and/or a viscosity of 0.14 to 0.37 PaS at a shear stress of 600 Pa, and/or a viscosity of 0.16 to 0.45 PaS at a shear stress of 800 Pa.

Preferably, the volume fraction of the thickening agent in the shear thickening fluid is selected so that the shear thickening fluid has a viscosity of 0.13 to 0.21 PaS at a shear stress of 200 Pa, and/or a viscosity of 0.15 to 0.27 PaS at a shear stress of 400 Pa, and/or a viscosity of 0.19 to 0.37 PaS at a shear stress of 600 Pa, and/or a viscosity of 0.22 to 0.45 PaS at a shear stress of 800 Pa. Advantageously, the volume fraction of the thickening agent in the shear thickening fluid is selected so that the shear thickening fluid has a viscosity of about 0.13 PaS at a shear stress of 200 Pa, and/or a viscosity of about 0.15 PaS at a shear stress of 400 Pa, and/or a viscosity of about 0.19 PaS at a shear stress of 600 Pa, and/or a viscosity of about 0.22 PaS at a shear stress of 800 Pa.

According to a third aspect of the invention there is provided a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is in the range 47 to 52%.

Advantageously, the volume fraction of the thickening agent in the shear thickening fluid is in the range 48 to 52%, preferably 48 to 50%, more preferably 48.5 to 49.5%, most preferably about 49%.

Advantageously, the volume fraction of the thickening agent in the shear thickening fluid is in the range 49 to 52%, preferably 49 to 50%, most preferably about 49%.

The particles may be inorganic particles or polymers. Examples of particles include silica, other oxides, calcium carbonate, and polymers such as polystyrene and poly (methyl methacrylate) and related copolymers.

The liquid may be an organic liquid, a silicon based liquid or aqueous. Examples of organic liquids include glycols such as ethylene glycol and polyethylene glycol, and ethanol. Examples of silicone based liquids include silicone oils and phenyltrimethicone.

In particularly preferred embodiments, the particles are silica and the solvent is a glycol, especially ethylene glycol.

The fibrous armour material is typically in the form of a suitable textile layer produced by a textile production technique such as weaving. Non-woven textile layers may be used.

The fibrous armour material preferably contains aramid fibres, typically poly (paraphenylene terephthalamide) fibres (Kevlar®). Other high strength fibres which are able to dissipate the kinetic energy of moving objects may be used to form the fibrous armour material. Examples of such fibres include graphite, nylon, glass fibres, nanofibres and other high strength polymeric fibres such as high strength polyethylene.

According to a fourth aspect of the invention there is provided a protective material for dissipating the kinetic energy of a moving object including a plurality of layers of fibrous armour material, in which at least one of said layers is a fibrous armour material of the first, second or third aspects of the invention.

According to a fifth aspect of the invention there is provided an article of body armour including a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is in the range 48 to 50%.

According to a sixth aspect of the invention there is provided a vehicle including a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is in the range 48 to 50%.

The protective material may be present as a lining for a cabin area of the vehicle in order to protect occupants of the vehicle from external moving objects.

The vehicle may be in the form of a motorised land vehicle or an aircraft. Where the vehicle is in the form of an aircraft, the fibrous armour material may be present as an engine lining.

According to a seventh aspect of the invention there is provided a flexible structure for mitigating the effects of blast events including a fibrous armour material for dissipating the kinetic energy of a moving object which is impregnated with a shear thickening fluid, in which the shear thickening fluid includes particles of a thickening agent suspended in a liquid, and the volume fraction of the thickening agent in the shear thickening fluid is in the range 48 to 50%. The flexible structure may be in the form of a tent or a blanket.

According to an eighth aspect of the invention there is provided a method of manufacturing a fibrous armour material for dissipating the kinetic energy of a moving object including the step of impregnating a fibrous armour material with a shear thickening fluid, in which the shear thickening fluid includes particles of a thickening agent suspended in a solvent, and the volume fraction of the thickening agent in the shear thickening fluid is selected so that the shear thickening fluid has a viscosity-shear stress characteristic substantially corresponding to curve B or lying between curve B and curve D as shown in FIG. 2.

According to a ninth aspect of the invention there is provided a method of manufacturing a fibrous armour material for dissipating the kinetic energy of a moving object including the step of impregnating a fibrous armour material with a shear thickening fluid, in which the shear thickening fluid includes particles of a thickening agent suspended in a solvent, and the volume fraction of the thickening agent in the shear thickening fluid is selected so that the shear thickening fluid has a viscosity of 0.11 to 0.21 PaS at a shear stress of 200 Pa, and/or a viscosity of 0.13 to 0.27 PaS at a shear stress of 400 Pa, and/or a viscosity of 0.14 to 0.37 PaS at a shear stress of 600 Pa, and/or a viscosity of 0.16 to 0.45 PaS at a shear stress of 800 Pa.

According to a tenth aspect of the invention there is provided a method of manufacturing a fibrous armour material for dissipating the kinetic energy of a moving object including the step of impregnating a fibrous armour material with a shear thickening fluid, in which the shear thickening fluid includes particles of a thickening agent suspended in a liquid, and the volume fraction of the thickening agent in the shear thickening fluid is in the range 47 to 52%.

Whilst the invention has been described above, it extends to any inventive combination of the features set out above, or in the following description, drawings or claims.

Embodiments of the present invention will now be described, by way of example only, with reference to the accompanying drawings, in which:

FIG. 1 shows penetration depths at various impact velocities obtained from ballistic tests on layers of Kevlar® impregnated with STF's of various volume fractions of silica; and FIG. 2 shows viscosity vs shear stress characteristics of STF's having various volume fractions of silica.

A number of STF's were prepared by suspending silica particles in ethylene glycol at varying volume fractions. STF's were prepared with silica volume fractions of 43%, 46%, 49%, 52%, 55% and 57%. Samples of protective material were prepared by impregnating structures made up of 4 layers of Kevlar® with the STF's. In each instance, a 4 layer Kevlar® structure was impregnated with 40 g of a STF of a chosen volume fraction of silica.

Ballistic tests were performed on the impregnated protective materials according to methodologies which will now be described. The impregnated layers were stacked on top of each other and retained within a polyethylene bag. These samples were then intimately held against the surface of a witness clay block with strips of elastic. The clay block was conditioned prior to testing in a 30° C. oven for three hours and the face of the block was smoothed to ensure a flat surface was provided. A 4.1 g, 10 mm diameter steel spherical projectile was fired at the samples from a gas gun, which is positioned with respect to the clay block to provide a projectile free flight of ca. 2 m. Careful alignment of the gas gun and target system ensured that the impact on the target was better than ±5 mm of the specified impact point. Prior to impact, the steel projectile passed through a velocity measurement apparatus in the form of two magnetic induction coils. The passage of the projectile through the magnetic field induces a current in the coils. The distance between the coils is known accurately, and hence an estimate of the projectile velocity can be made from the time taken for the projectile to travel between the coils. The method has an accuracy of better than ±2%.

Optical images of the projectile and the deformation of the samples upon impact were captured using a high speed camera positioned obliquely to one side of the target to enable observation of the front face of the sample during impact. The performance of the samples was investigated by comparing the penetration depth and the profile of the penetration of the sample and/or projectile into the clay block. The profile of the penetration is also referred to herein as the back face trauma signature. Measurements of the penetration depth were made from plaster casts of the witness clay using Vernier height callipers. An error of ±1 mm was assigned to each measurement of penetration depth.

FIG. 1 shows the results of the ballistic tests. It can be seen that there is little difference in the impact performance around 160 ms$^{-1}$. However, a difference in performance is more noticeable upon perforation. For impacts at velocities approaching 260 ms$^{-1}$ and above, there is a marked difference in performance, and the 49% volume fraction STF impregnated sample gives rise to a significantly lower penetration depth. This indicates that the 49% volume fraction STF impregnated sample absorbs most energy upon impact.

The flow properties of a number of the STF's were investigated. More particularly, measurements were made on the STF's having silica volume fractions of 46%, 49%, 52% and 55%. The prepared STF samples were analysed for their flow properties using a controlled stress Malvern Bohlin Gemini rheometer, fitted with a 60 mm diameter/1° taper cone and plate geometry. The plate was set at a temperature of 25° C.

To determine the flow properties of the fluids, the tests were performed in stress controlled mode, whereby an increasing shear stress was applied to the samples, measuring the corresponding viscosity and shear rate.

The following parameters were set to perform these tests:

| | |
|---|---|
| Geometry | CP1°/60 mm |
| Controlled Mode | Stress controlled |

| Shear Range | (25-900) Pascals |
|---|---|
| Measurement Time | 310 seconds |
| Temperature | 25° C. |
| Thermal Equilibrium | 60 seconds |

The samples were measured at least three times to check the reproducibility of the results. Runs were rejected when the plate had not been completely covered by sample.

The measured viscosity-shear stress characteristics for the STF's are shown in FIG. 2. Curve A corresponds to the 55% volume fraction STF, curve B corresponds to the 52% volume fraction STF, curve C corresponds to the 49% volume fraction STF, and curve D corresponds to the 46% volume fraction STF, The associated ballistic performance of protective materials impregnated with the 46% and 55% volume fraction STF are not highly desirable, and therefore the viscosity-shear stress characteristic curves A and D are not preferred. Good ballistic results can be obtained using STF's with a viscosity-shear stress characteristic curve B, or with a viscosity-shear stress characteristic curve lying between curves B and D as shown in FIG. 2. A preferred group of STF's have viscosity-shear stress characteristic curves corresponding to curve B, curve C or lying between curves B and C as shown in FIG. 2. The best ballistic results are obtained with the 49% volume fraction STF, which corresponds to curve C in FIG. 2. Without wishing to be bound by any particular theory or conjecture, it is believed that the excellent ballistic properties are a consequence of the rheological properties of the STF, in particular the viscosity-sheer stress characteristic. Accordingly, STF's with viscosity-sheer stress characteristics close to curve C as shown in FIG. 2 are most strongly preferred. Table 1 shows the measured viscosities for the 52%, 49% and 46% volume fraction STF's at a number of applied sheer stresses.

TABLE 1

Viscosity (PaS) at specified shear stress values

| STF volume fraction/% | Shear Stress (Pa) | | | |
|---|---|---|---|---|
| | 200 Pa | 400 Pa | 600 Pa | 800 Pa |
| 52 | 0.21 PaS | 0.27 PaS | 0.37 PaS | 0.45 PaS |
| 49 | 0.13 PaS | 0.15 PaS | 0.19 PaS | 0.22 PaS |
| 46 | 0.10 PaS | 0.12 PaS | 0.13 PaS | 0.15 PaS |

Fibrous armour material and protective material of the invention can be used in a variety of soft body armour systems. The advantageous property of flexibility can be exploited in order to provide body armour to protect regions of the body which are difficult to protect using conventional materials. For example, it is difficult to provide protection for the neck region due to interference between body armour and any headwear worn by an individual, particularly when in a prone position. Protective material of the invention may be used to provide an anti-ballistic and/or spike resistant collar which is sufficiently flexible to address this problem. Protective material of the invention may be combined with other protective systems. For example, the protective material may be placed behind another armour system such as ceramic armour plates to reduce back face trauma. Such systems could increase the extent of the protection offered and/or reduce the thickness of the armour pack. Pouches of protective material may be provided for this purpose. Spike resistant or anti-ballistic body armour can be made using protective material of the invention. A multiple threat armour which provides spike and ballistic protection can be produced using two or more different protective materials, in which an outer structure is configured to mitigate spike threats and an inner structure is configured to provide ballistic protection.

Protective material of the invention can be used for purposes other than body armour. Examples include spall liners for vehicles, blast tents or like structures for blast containment, and engine or turbine linings, especially linings for aircraft engines, for containing detached moving parts or fragments.

The invention claimed is:

1. A fibrous armour material for dissipating the kinetic energy of a moving object, said fibrous armour material being impregnated with a shear thickening fluid, in which the shear thickening fluid includes particles of a thickening agent suspended in a liquid, and the volume fraction of the thickening agent in the shear thickening fluid is selected to be in the range 47 to 50% so that the shear thickening fluid has at least one of:
   a viscosity of 0.11 to 0.21 PaS at a shear stress of 200 Pa,
   a viscosity of 0.13 to 0.27 PaS at a shear stress of 400 Pa,
   a viscosity of 0.14 to 0.37 PaS at a shear stress of 600 Pa, and
   a viscosity of 0.16 to 0.45 PaS at a shear stress of 800 Pa.

2. A fibrous armour material according to claim 1, in which the volume fraction of the thickening agent in the shear thickening fluid is selected so that the shear thickening fluid has at least one of:
   a viscosity of 0.13 to 0.21 PaS at a shear stress of 200 Pa,
   a viscosity of 0.15 to 0.27 PaS at a shear stress of 400 Pa,
   a viscosity of 0.19 to 0.37 PaS at a shear stress of 600 Pa, and
   a viscosity of 0.22 to 0.45 PaS at a shear stress of 800 Pa.

3. A fibrous armour material according to claim 2, in which the volume fraction of the thickening agent in the shear thickening fluid is selected so that the shear thickening fluid has at least one of:
   a viscosity of about 0.13 PaS at a shear stress of 200 Pa,
   a viscosity of about 0.15 PaS at a shear stress of 400 Pa,
   a viscosity of about 0.19 PaS at a shear stress of 600 Pa, and
   a viscosity of about 0.22 PaS at a shear stress of 800 Pa.

4. A fibrous armour material according to claim 1 in which the volume fraction of the thickening agent in the shear thickening fluid is in the range 48 to 50%.

5. A fibrous armour material according to claim 4 in which the volume fraction of the thickening agent in the shear thickening fluid is in the range 49 to 50%.

6. A fibrous armour material according to claim 1 in which the particles are inorganic particles.

7. A fibrous armour material according to claim 1 in which the particles are silica.

8. A fibrous material according to claim 1 in which the liquid is an organic liquid, a silicone based liquid or aqueous.

9. A fibrous armour material according to claim 1 in which the liquid is ethylene glycol.

10. A fibrous armour material according to claim 1 which contains aramid fibres.

11. A fibrous armour material according to claim 1, incorporated into a protective material for dissipating the kinetic energy of a moving object including a plurality of layers of fibrous armour material, in which at least one of said layers is impregnated with the shear thickening fluid.

12. A fibrous armour material according to claim 1, incorporated into an article of body armour.

13. A fibrous armour material according to claim 1, incorporated into a vehicle.

14. A fibrous armour material according to claim 13, incorporated into an aircraft.

15. A fibrous armour material according to claim 14, wherein the fibrous armour material is present in the aircraft as an engine lining.

16. A fibrous armour material according to claim 1, incorporated into a flexible structure for mitigating the effects of blast.

17. A fibrous armour material according to claim 16, wherein the flexible structure includes a tent or blanket.

18. A fibrous armour material according to claim 1 in which the volume fraction of the thickening agent in the shear thickening fluid is 49%.

19. A fibrous armour material according to claim 1 which includes poly paraphenylene terephthalamide fibres.

* * * * *